United States Patent
Kumar et al.

(10) Patent No.: US 9,911,413 B1
(45) Date of Patent: Mar. 6, 2018

(54) NEURAL LATENT VARIABLE MODEL FOR SPOKEN LANGUAGE UNDERSTANDING

(71) Applicant: Amazon Technologies, Inc., Seattle, WA (US)

(72) Inventors: Anjishnu Kumar, Seattle, WA (US); Markus Dreyer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/392,718

(22) Filed: Dec. 28, 2016

(51) Int. Cl.
| | |
|---|---|
| *G10L 15/00* | (2013.01) |
| *G10L 15/18* | (2013.01) |
| *G06N 3/08* | (2006.01) |
| *G06F 17/24* | (2006.01) |
| *G06F 17/27* | (2006.01) |
| *G10L 15/16* | (2006.01) |
| *G10L 15/02* | (2006.01) |
| *G10L 15/06* | (2013.01) |
| *G10L 15/22* | (2006.01) |

(52) U.S. Cl.
CPC ........ *G10L 15/1815* (2013.01); *G06F 17/241* (2013.01); *G06F 17/2785* (2013.01); *G06N 3/08* (2013.01); *G10L 15/02* (2013.01); *G10L 15/063* (2013.01); *G10L 15/16* (2013.01); *G10L 15/22* (2013.01); *G10L 2015/0635* (2013.01); *G10L 2015/223* (2013.01)

(58) Field of Classification Search
CPC ..... G10L 15/22; G06F 17/271; G06F 17/2785
See application file for complete search history.

(56) References Cited

U.S. PATENT DOCUMENTS

| | | | | |
|---|---|---|---|---|
| 4,914,590 A | * | 4/1990 | Loatman ............... | G06F 17/274 704/8 |
| 7,292,976 B1 | * | 11/2007 | Hakkani-Tur ........ | G06F 17/277 704/231 |
| 8,798,990 B2 | * | 8/2014 | Bangalore ............. | G10L 15/183 704/1 |
| 9,792,904 B2 | * | 10/2017 | Bangalore ............. | G10L 15/183 |
| 2003/0212544 A1 | * | 11/2003 | Acero ................... | G06F 17/241 704/9 |

* cited by examiner

*Primary Examiner* — Daniel Abebe
(74) *Attorney, Agent, or Firm* — Occhiuti & Rohlicek LLP

(57) ABSTRACT

A linguist classifier, for instance intent or slot classifier, is updated using data with only partial annotation indicating overall correctness rather that specific correct intent or slot values, which are treated as "latent" (i.e., unknown) variables. Full annotation of the data is not required. A small amount of fully annotated data may be combined with a substantially larger amount of partially annotated data to update the linguistic classifier. In a specific implementation, the linguistic classifier is a neural network and the weights are trained using a reinforcement learning approach.

20 Claims, 6 Drawing Sheets

NEURAL LATENT VARIABLE MODEL FOR SPOKEN LANGUAGE UNDERSTANDING

BACKGROUND

This invention relates to configuration of a spoken language understanding system, and more particularly, to determination of parameters for configuring a classifier based on partially annotated linguistic data.

A language understanding system may be designed to enable a user to provide a linguistic input, for example, in the form of text or as a spoken utterance, and for the system to determine the user's intent or to determine values of semantically meaningful items in the input. Some systems can respond to a wide range of user intents and these intents may be grouped. For example, intents related to interacting with a messaging system (e.g., Twitter) may be grouped. Each such group may be referred to as a "skill." For example, "post a tweet" may be an intent in the "Twitter" skill. Often, a system may be configured to support a large number of skills, and each skill may have anywhere from one to hundreds or more different intents.

It is desirable to have the system improve its accuracy in the task of determining the skill and intent from user's inputs. One way to do this is to collect input data during operational use of the system, and then manually (i.e., using a human reviewer) annotate the inputs with the correct skill and intent for each input. Once a sufficient amount of such annotated data is prepared, the configuration of the system may be updated to better match the annotated input, and thereby hopefully provide improved accuracy for further user input utterances.

However, the task of manually annotating sufficient amounts of collected input may require a prohibitive amount of effort (i.e., person-hours of annotation time), and therefore may not be feasible. Nevertheless, it is important to provide a way to improve accuracy, for example, during an initial period after a skill is first introduced when relatively little data may be available from which to configure the system.

DETAILED DESCRIPTION

Figure 1:
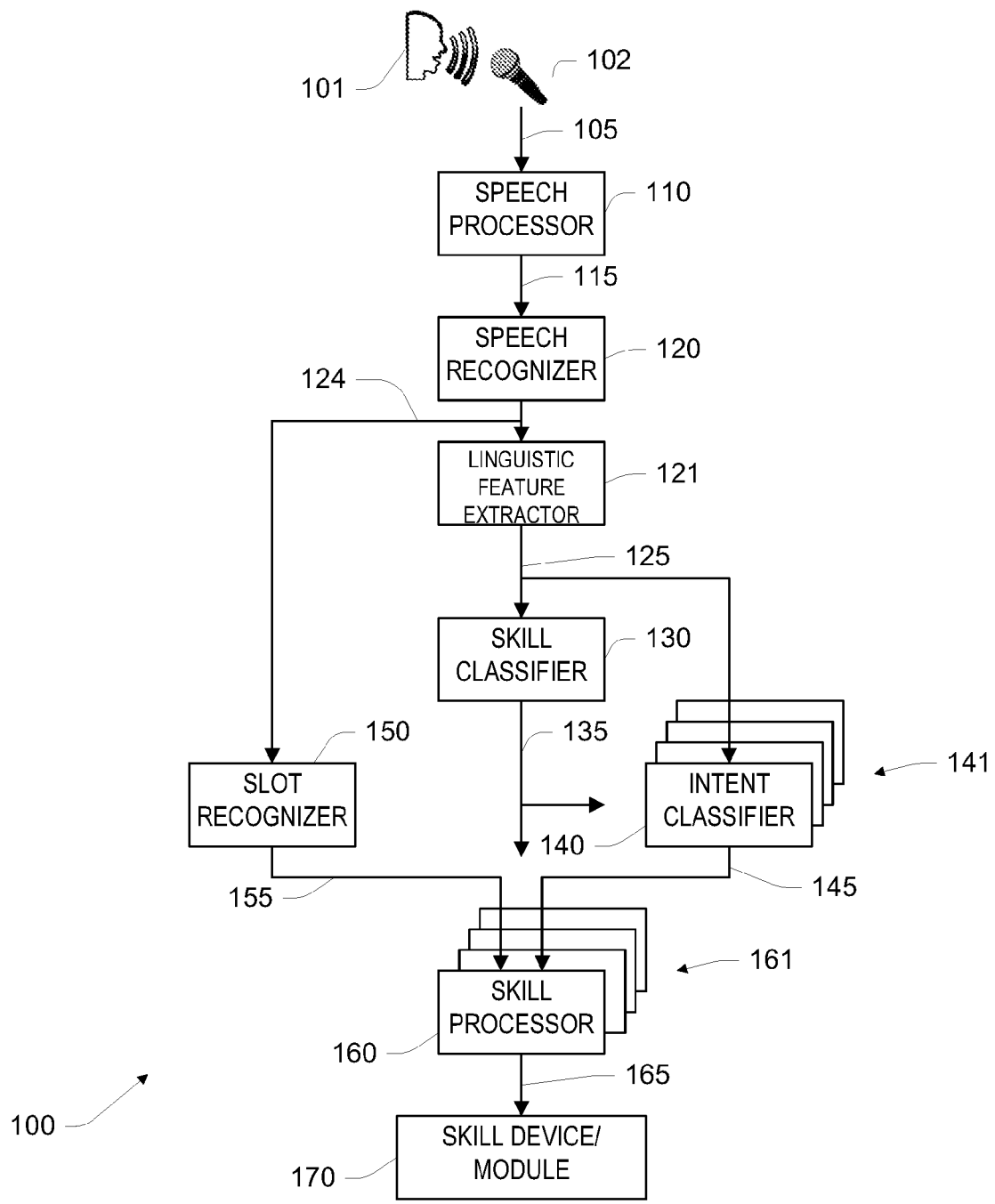
FIG. 1 is a block diagram of a spoken language understanding system.

Referring to FIG. 1, a speech-based system 100 accepts spoken inputs from the user, which are generally commands, and acts on those inputs. The system is a natural language understanding system that is configured to recognize the user's intent within a large set of "skills," where each skill generally has a fixed set of intents associated with it. The system is also configured to determine values of "slots," which are generally semantically meaningful items in the input. Very generally, the system processes the input in a first stage in which it determines with which skill the user's input is associated. Then, in a second stage, skill-specific processing determines the user's intent within that skill, locates instances of slot values in the input, and acts on that skill-specific intent. In this description, "intent" should be understood broadly to include goals, tasks, sub-tasks, and the like associated with a result that the user intended to occur upon linguistic processing of the user's input by the system.

Continuing to refer to FIG. 1, a user's input speech signal 105 may be acquired with a microphone 102, or may be received as a data representation (e.g., as waveform sample values or a processed form of such sample values) from a remote microphone-equipped device. In any case, the speech signal 105 is processed by a speech processor 110 to produce speech features 115. Various types of features may be used. In this embodiment, the features are vectors of quantities computed at regular intervals (e.g., every 10 ms.) in the input speech signal, with the quantities being numerical representations of energy in a number of frequency bands within the typical range of frequencies of human speech. The speech features 115 are processed by a speech recognizer 120, which produces a recognizer output 124 based on its input 115. In this embodiment, the linguistic representation is a recognized text sequence, but it should be understood that other forms of output are possible, including N-best lists, word lattices etc. The recognizer output 124 is further processed by a linguistic feature extractor 121, which forms a fixed-length feature representation 125 of the recognizer output 124. This representation is referred to below as the "linguistic representation" of the user input, and is formed, for example, as a vector of real-valued entries with each entry indicating presence of a corresponding word in a known vocabulary, a class of words, a word pair, or a word n-gram, etc. in the recognizer output.

In the first stage of processing, a skill classifier 130 processes the linguistic representation 125. The skill classifier 130 is a high precision module that is configured according to human authored rules and/or automatically trained numerical parameters to accept the linguistic representation, and to make a selection of the particular skill 135 that is represented in the linguistic representation 125. This selection is made from a configured set of skills known to the system at the time. For example, the system may be configured with hundreds or thousands of different skills, and the skill classifier selects that skill that best matches the linguistic input. In some examples, the skill classifier is a rule based system augmented with a statistical system (e.g., a conditional random field tagging mode). In yet other examples, the skill classifier 130 is a skill detection system which provides a top-N (e.g., top 5) set of skills, and the processing described below for one skill is repeated for each of the top N skills.

In the second stage of processing, the skill has already been selected and therefore skill-specific processing of the user's input is performed. One part of this processing of the linguistic representation 125 includes an intent classifier 140 selecting the best-matching intent 145 from the set of intents associated with the selected skill 135. Note that each skill may have a different set of possible intents. There may be different numbers of possible intents associated with different skills, and there may be no direct relationship between intents of one skill and another. The particular intent classifier 140 is selected from the available set of intent classifiers 141 according to the skill 135 output from the skill classifier. In general, skills have more than two intents from which the system selects the best matching one.

In another part of second stage of processing, semantically meaningful values represented in the user's input, for example, named entities or slot values, are recognized in the linguistic representation 125 by a slot recognizer 150, producing slot values 155. In general, the slot recognizer 150 is configured to detect and recognize instances of generic slots, for example, phone numbers. In some examples, the slot recognizer 150 is augmented to detect instances of skill-specific slots.

The recognized intent 145 and the recognized slot values 155 are passed to a skill-specific skill processor 160. The particular skill processor 160 is selected from the set of skill processors 161 for all the skills known to the system, where the selection of the skill processor 160 is selected according to the skill 135 output from the skill classifier 130 and is consistent with the selection of the intent classifier 140. In this way, the representation of the intent 145 passing from the output of the intent classifier 140 to the input to the skill processor 160 only needs to be meaningful for these corresponding modules. For example, the intents may be represented as text strings. However, there is no requirement that these strings be meaningful to a human reader of those strings (although in practice using various mnemonic or abbreviated forms may be used by developers).

The skill processor 160 processes the intent 145 and the slot values 155 and outputs an instruction 165, which the system passes to the appropriate device or software module (e.g., over a network to a server process) for acting on the user's intent within the recognized skill. As an example, a "Twitter" skill may have intents including "post a tweet," "reply to a tweet," "search for a tweet," "search for local trends," "look up a private message," etc. For a user input 105 of "Alexa post a tweet saying Hello World", the skill classifier 130 may correctly identify the utterance as being associated with the "Twitter" skill, and may incorrectly classify the intent as "search for a tweet" with the slot "search=Hello World", rather than correctly classifying it as a "post a tweet" intent with the slot "message=Hello World".

Figure 2:
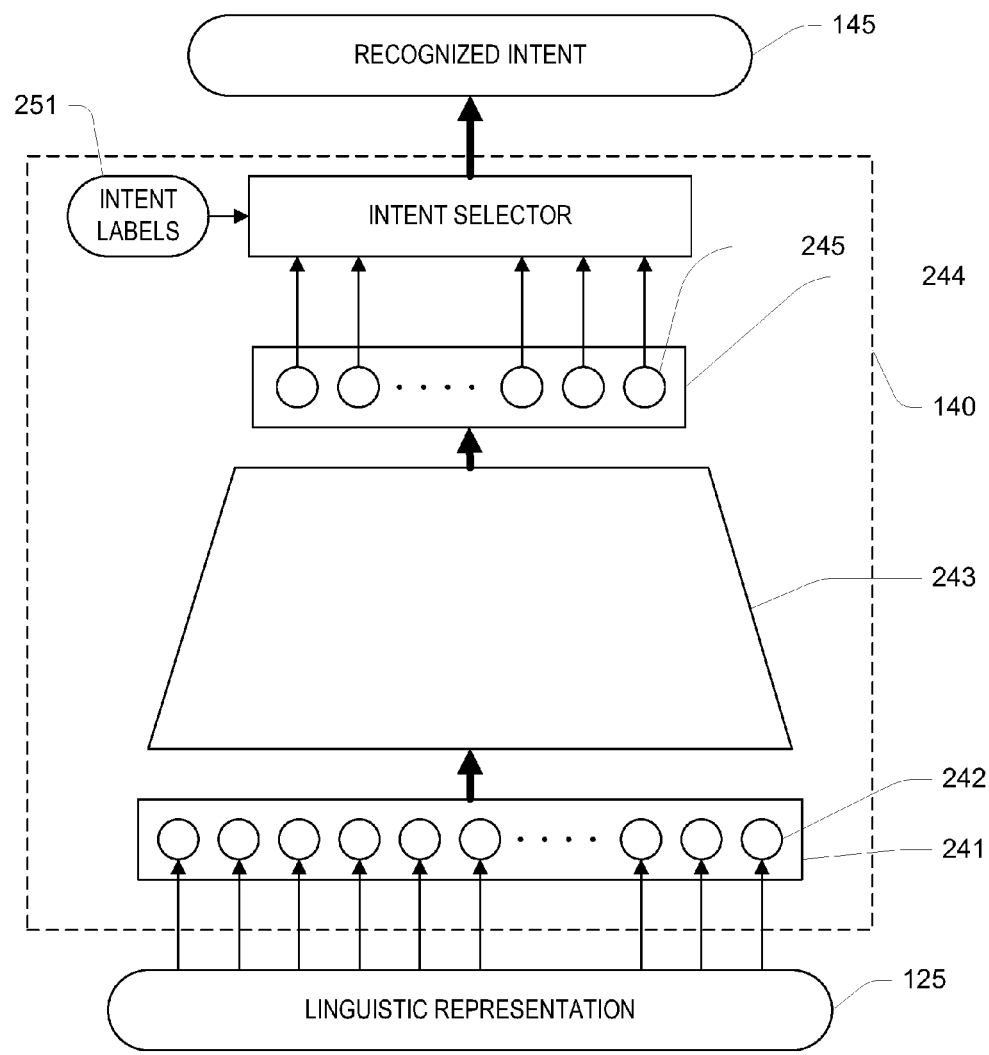
FIG. 2 is a diagram of an intent classifier of FIG. 1.

The skill-specific intent classifiers 140 may be parameterized such that the parameters values are determined in a manner to improve the accuracy of the classifiers. This determining generally involves estimating or optimizing values of the parameters in a procedure often referred to as "training" or "learning." For example, the intent classifiers 140 are artificial neural networks (e.g., deep neural networks) and the parameters are weights of the neural network, which are used to multiply values passing through the network. Referring to FIG. 2, a representative intent classifier 140 receives the linguistic representation 125 (e.g., a fixed-length vector of real values) at its input layer, and provides K outputs 245 (also real values) at its output layer 244, in this embodiment with each output being associated with a different intent. In this embodiment, each of the K outputs is a numerical value in the range 0.0 to 1.0, and the sum of the K outputs is 1.0—that is, the K outputs have the form of a probability distribution. The K outputs are passed to an intent selector 250, which identifies the highest value output, and passes a corresponding text representation from a set of intent labels 251 as the recognized intent 145. In some examples, the neural network has a recurrent neural network (RNN) encoder layer 241, followed by a feed forward network 243.

One way to train one of the classifiers 140 is to collect representative data items, with each item representing a pair consisting of a linguistic representation and a corresponding true intent associated with that linguistic input. In this example in which the outputs have the form of a probability distribution, the true intent is represented with values 0.0 for outputs corresponding to intents other than the true intent, and 1.0 for the output corresponding to the true intent. In a conventional neural network learning procedure, the collected data items processed in an iteration in which, at each iteration, the parameter values of the intent classifier are incrementally modified to better predict the true intents. For example, a conventional Back Propagation parameter update procedure is used.

One way to collect the representative data items used to training is through human annotation. For example, a large number of user utterances are recorded. For each utterance, a human annotator listens to the recording and enters the intent for the defined set of intents for the skill or skills to which the input may relate. For example, the annotator selects from a set of defined text representations of the intents. The utterances are processed to form recognizer outputs and linguistic representations of those outputs in the same manner as operational speech signals 105 are processed to form linguistic representations 125. As another additional or alternative source of representative data items, sample text representations of user input are provided, for example, by a developer rather than users, and corresponding linguistic inputs are computed in the same manner as linguistic inputs are computed from the recognizer outputs. Optionally, many data items corresponding to the same intent may be synthesized from each actual input and used for training. For instance, text (e.g., recognizer output or developer entered text) may be processes to form a semantically equivalent set, for example, by substituting synonyms or modifying sentence structure without changing the meaning. As another example, the linguistic input is processed with a statistical resampling procedure to generate similar linguistic inputs that are presumed to be related to the same intent.

Although such training of each intent classifier 140, which we refer to herein as "full supervision" training, may be relatively straightforward, the effort required for complete intent annotation may be substantial. Furthermore, it may not be practical (or even possible) for the annotator to be able to identify the specific intents associated with some skills, or even if they identify the intent, they may not know the associated text representation of the intent that was chosen by the developer of that skill. For example, the mnemonics chosen by the developer may not have intuitively obvious associations with particular intents that the annotator might identify.

On the other hand, there may be a substantial amount of data available, for example, by recording operational use of the system (i.e., by users using the system to accomplish tasks based on their spoken inputs). It is desirable to make use of such data to improve the accuracy of the intent classifiers, without incurring all the effort required for full annotation of recorded use of the system. Furthermore, it is desirable to continually or periodically improve performance as more operational data becomes available.

Another way to train the intent classifiers 140, referred to herein as "partial supervision" training, does not require full annotation of all the recorded of user inputs, while nevertheless benefitting from improved accuracy through its use. Very generally, for each data item, the linguistic representation 125 is processed in the manner illustrated in FIG. 1, with the exception that the instruction 165 output from the skill processor (and optionally the selected skill 135 and/or selected intent 145) is presented to the annotator. The annotator then marks the instruction 165 as correct versus incorrect. It should be evident that the marking of correct versus incorrect may require substantially less effort than the full annotation of intent, and does not present at least some of the difficulties associated with the annotator having to know the representations of the intents output from the intent classifiers. In the discussion below, such data is referred to as "partially annotated" data, while the data that is annotated with the specific intents is referred to as "fully annotated" data.

Although this way of training the intent classifier 140 makes use of partially annotated data, it also requires (or at least benefits from) at least some fully annotated data. In general, there is substantially more partially annotated data that fully annotated data. However, it should become evident that if there were no fully annotated data for training, then the association of particular intents with particular outputs of the intent classifier would not necessarily be consistent with the inputs expected by the skill processor 150.

Therefore, in a first phase of training of an intent classifier 140, for example prior to operational use, the parameters are first determined using a "full supervision" approach described above. That is, each data item used for training in this phase is associated with an input linguistic representation to the intent classifier, and a correct output value for each of the output units of the intent classifier. After this first phase, the parameter values may not be optimal, but they are at least consistent with the full annotation data used to determine the parameters.

Figure 3:
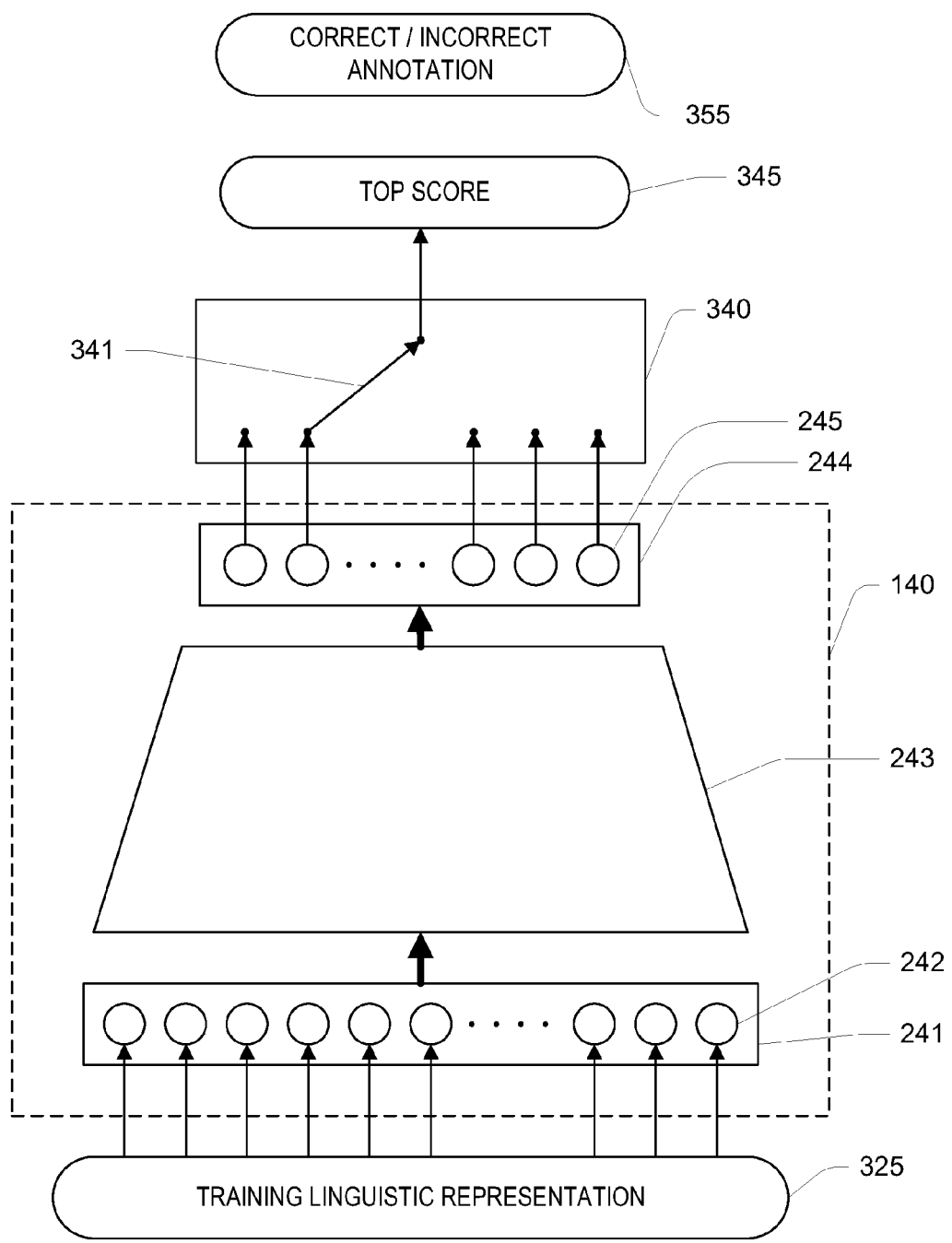
FIG. 3 is a diagram of a parameter updating configuration of the intent classifier of FIG. 2.

In a second phase of training of the intent classifier, the parameters are incrementally modified using partially annotated data. Referring to FIG. 3, each item of the partially annotated data includes a linguistic representation 325 and a correct-versus-incorrect annotation 355. The linguistic representation 325 is passed into the neural network and values are produced by output layer 244 of the neural network. The highest scoring output is passed via a selective link 341 to the output of a selector layer 340 to provide the top score 345. If the correct versus incorrect annotation 355 indicates that the result was correct, then it is desirable that the top score as high and as close to 1.0 as possible. If the correct versus incorrect annotation 355 indicates that the result was incorrect, then it is desirable that the top score as low and as close to 0.0 as possible. In this arrangement, the specific true intent is treated as a "latent" variable in the sense that it is not explicitly exposed in the parameter update procedure.

A reinforcement learning approach is used such that each item of the partially annotated data causes incremental updates of the values of the parameters of the intent classifier (e.g., the neural network weight values) to incrementally reduce the top score 345 in the case of an incorrect result and to incrementally increase the top score 345 in the case of a correct result. Note that in this example, the output layer 244 enforces that the sum of the outputs from each of the output units 245 is 1.0. Therefore, incrementally reducing a particular output indirectly increases the outputs of the other units. Therefore, it should be understood that even though only a single output of the output layer 244 is linked to the output of the sampling layer 340, the output layer 244 indirectly links the output of the sampling layer to all the inputs to the output layer 244.

As one example of the incremental update procedure, if the $k^{th}$ output (e.g., the $2^{nd}$, k=2, output as illustrated in FIG. 3) is the highest score output $y_k$ of the output layer 244 of the neural network, and $\theta_i$ a parameter or the intent classifier, this input contributes $+\alpha \partial y_k / \partial \theta_i$ in the case of a correct result, and the negative of this amount for an incorrect result, where $\alpha$ is a positive scale factor that determines the size of the increments. In some implementations, $\alpha$ is progressively reduced from iteration to iteration of the parameter update procedure. Generally, small batches ("mini batches") of data items are used to accumulate the increments to the parameter values, with the parameter values being updates once per batch.

In some implementations, the original fully annotated data are used to update the parameter values after a number of iterations with the partially annotated data. The purpose of this is to make sure that the parameter values do not result in misclassification of the fully annotated data. This approach can be referred to as a type of "regularization" of the parameter update procedure.

Figure 4:
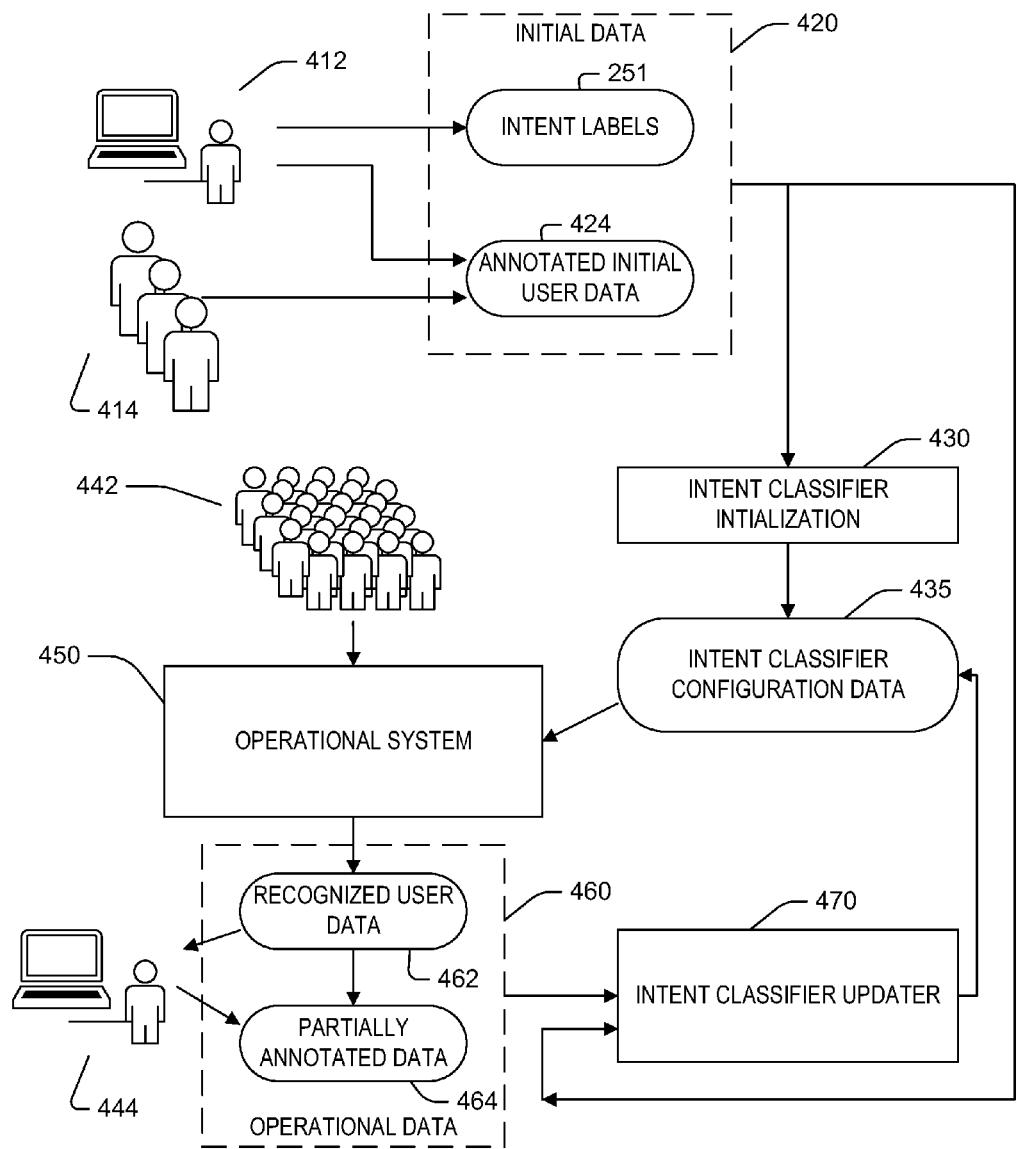
FIG. 4 is a data flow diagram that illustrated initial configuration and subsequent updating of the configuration using operational data.

In one use of the approach describe above, in a system 100 has been configured with a set of skills, a developer wishes to introduce a new skill with a number of skill-dependent intents. Referring to FIG. 4, the developer 412 implements a skill processor 160 (not shown in FIG. 4) for the new intents for the skill, and specifies the set of labels 251 (e.g., used in FIG. 2) for those skills. The developer also collects a limited amount of data, for example recognized spoken utterances from a set of people 414, or sample text input from the developer 412, and fully annotates that data for form annotated initial data 424. Together, the skill labels 251 and annotated initial data 424 form initial data 420, which is passed to an intent classifier initialization 430. As discussed above, the intent classifier 140 is configured with numerical values (e.g., weights), and the intent classifier initialization 430 computes initial values for the parameters and stores them as intent classifier configuration data 435. The intent classifier 140 for this skill configured with these determined parameter values is sufficiently accurate to begin collection and partial annotation of further data during operational use of the system. In particular, a relatively large set of operational users 442 uses the operational system 450. Recognized user data 462, which includes the user input as well as the result of the operational system recognizing the intent (e.g., the command output 165 in FIG. 1). After a period of collection of the operational data, and from time to time thereafter, an annotator 444 (or multiple annotators) marks each user input as either correct of incorrect to produce partially annotated data 464. Together the recognized user data 462, which includes the user's input, and the partially annotated data 464 for operational data 460. This data is passed to an intent classifier updater, which implements the training approach describe above for use with partially annotated data is used to update the parameter values for the intent classifier to update the intent classifier configuration data 435 In this way the developer 412 is not burdened with collecting or fully annotating large amounts of data, while providing a way to improve accuracy of the system over time.

In an alternative to use of human partial annotation of the operational input data, an automated procedure infers correct-versus-incorrect annotation based on subsequent interaction between the user and the system, for instance, in a confirmation or correction dialog or as a result of a cancellation command.

The approach described above with reference to configuring the parameters of an intent classifier are also applied to other classifiers in the system. For instance, an example of the slot recognizer 150 is implemented as a multiway classifier, with one output per slot for the skill, and the classifier is applied at each position (e.g., word position) in the user's input. At each position, the classifier inputs a linguistic representation of the input at that position (e.g., based on input words up to that position, or input in a window around that position) and provides an output that indicates whether there is a slot value at that position, and which slot it represents. As with the intent data, the developer collects a limited amount of fully annotated data that indicates which slots are present at which positions in a limited amount of input. This fully annotated slot data is used to initially configure the slot recognizer.

The annotation regarding the correctness of the result is also used as partial annotation training of the slot recognizer. In particular, if the result is correct, the positions within the input that indicate that some slot value is present receive a positive reinforcement using the same approach as the positive reinforcement applied to the intent classifier. Note that there may be multiple slots recognized in an input, and the positive reinforcement is applied at each position that a slot value was detected. Similarly, on an incorrect result, a negative reinforcement is applied at each position that slot value was detected. Note that an incorrect result does not necessarily mean that the detected slot values are incorrect. However, because there is a correlation between incorrect results and incorrect slot values, negative reinforcement when slot value was in fact correct is offset by the positive reinforcement for the inputs annotated as yielding correct results.

Yet other classifiers within the system may be configured according to the approach described above. For example, an anaphora recognizer may be configured in this manner to locate substitute references (e.g., "it") in the user input.

Figure 5:
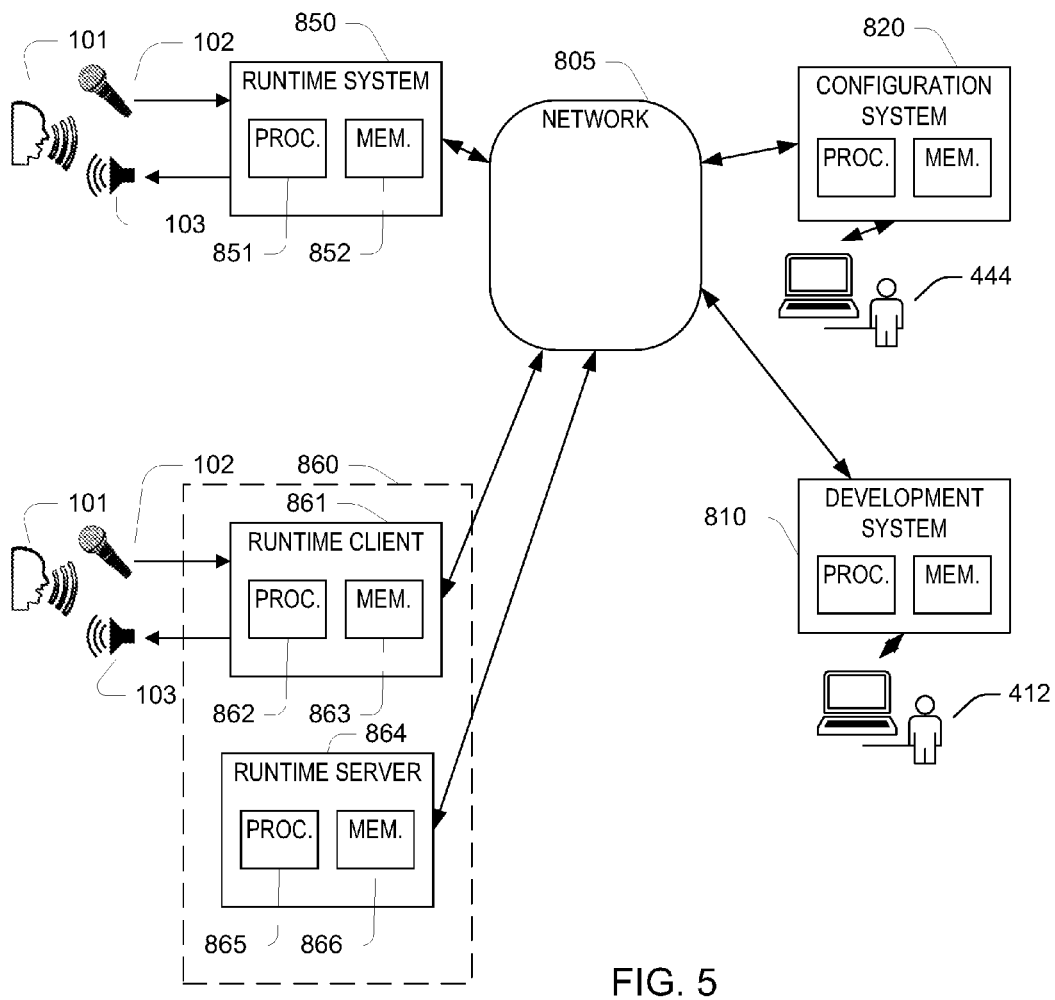
FIG. 5 is a system diagram.
Figure 6:
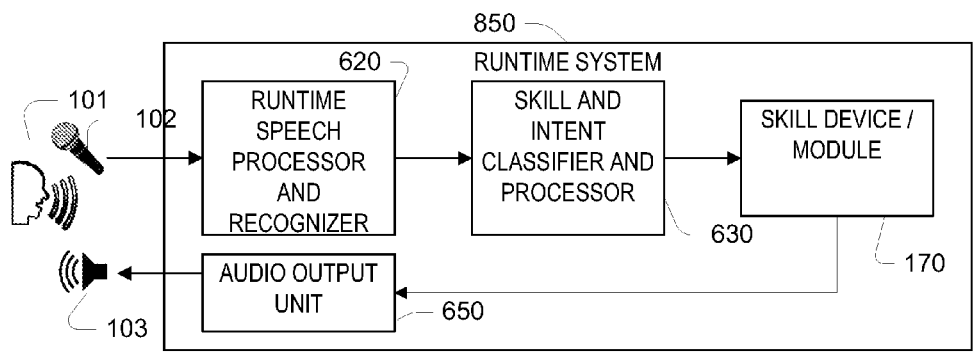
FIG. 6 is a block diagram of a runtime system.

Referring to FIG. 5, in some implementations, the system 100 shown in FIG. 1 may be hosted on a runtime system 850. The runtime system accepts audio input from a user 101 at a microphone 102, and optionally provides audio output to the user via a speaker 103. The runtime system may include a processor 851, for instance a general purpose processor or a digital signal processor (DSP), and a memory 852 (e.g., a non-transitory semiconductor memory readable by the processor). For example, the runtime system is an "appliance" that may be placed in the environment (e.g., on a shelf or table). In some examples, this device monitors its environment, and acts on user input, such as spoken commands, that is sensed in the environment. The runtime input processing procedures described above may be implemented in software that includes instructions for causing the processor 851 to perform the steps of the described procedures. The memory 852 also holds configuration data for the system, for example, including the values of weights used to configure the intent classifiers for one or more skills, and in software-based implementations software instructions for performing the numerical computations implementing the intent classifiers 140. The runtime system 850 may be coupled to a network 805 (e.g., a local area network and/or the public Internet). A development system 810, which is used by the developer 412, may be used to implement the collection of the initial data 420 used to initially configure the runtime system. A configuration system 820 may also be couple to the network. This configuration system may use the initial data 420 produced at the development system 810 to determine the configuration data 435 for one or more of the intent classifiers of the runtime system. The configuration system may also be used by an annotator 444, who partially annotates the operational data for updating the configuration data 435. In some implementations, the functions hosted by the runtime system 850 may be distributed in a distributed runtime system 860, which may have a runtime client 861, with a processor 862 and memory 863, and also a runtime server 864, which interacts with the runtime client 861 at runtime. For example, the runtime client 861 may implement data acquisition (e.g., signal processing and speech activity detection or detection of a wakeword) and feature extraction, and send the result to the runtime server 864 over the network 805, where speech recognition and skill and intent recognition based on the received data is performed. Referring to FIG. 6, the runtime system 850 of FIG. 5 (as well as the combined computers of the distributed runtime system 860) implement a logical processing in which the audio data produced from the acquired audio signal received at the microphone 102 is passed to a speech processor and recognizer 620 to produce, for example, a word sequence that is passed to a skill and intent classifier and processor 630, which implements the skill classifier 130 and intent classifiers 140. The output of the skill and intent classifier and processor 630 is passed to the skill device and/or module 170, which causes the commanded intent from the user to be acted upon. In some cases, the skill device and/or module causes an audio output to be passed to the user via an audio output unit, which implements, for example, an automatic speech synthesis procedure.

Figure 7:
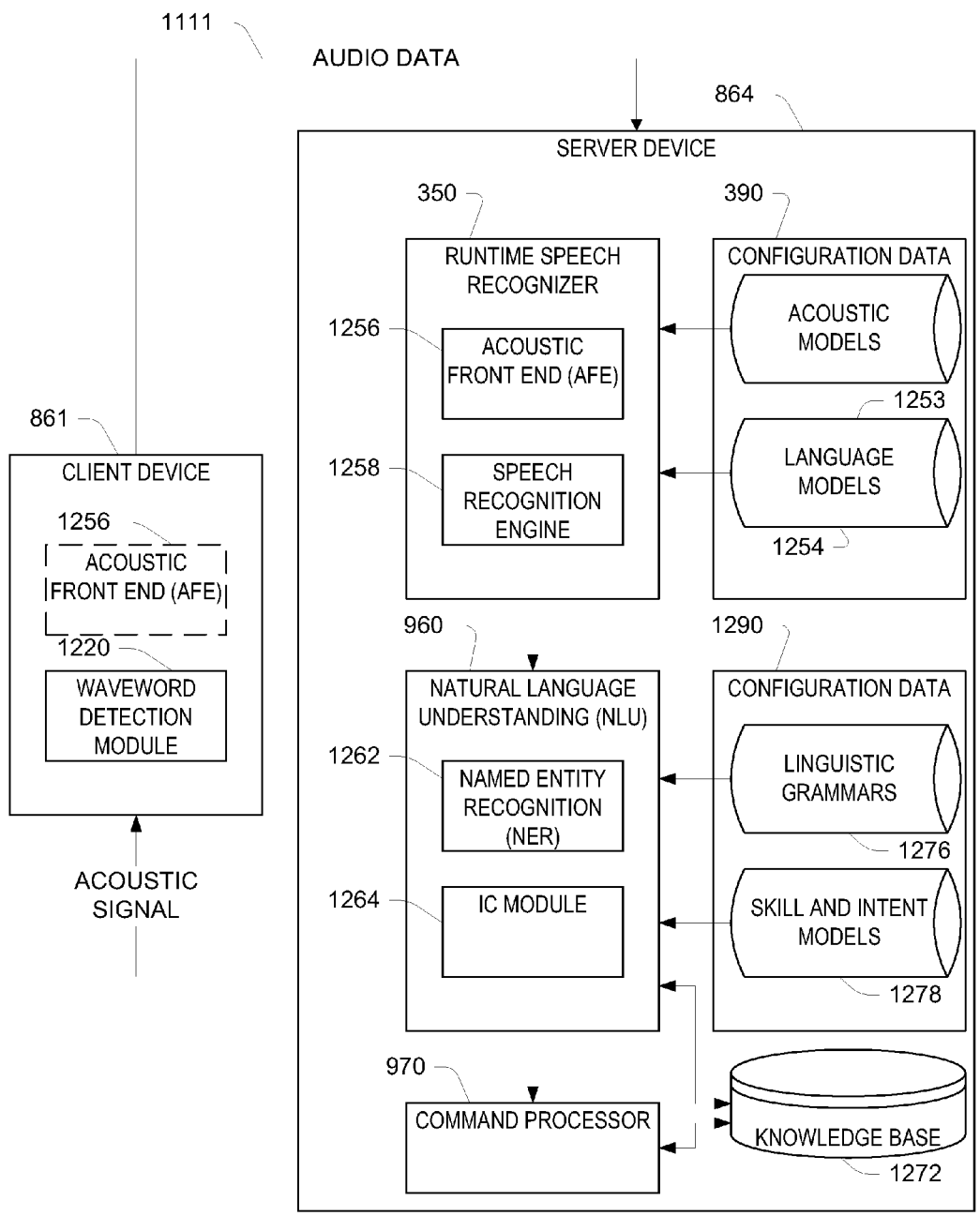
FIG. 7 is a diagram illustrating processing of a spoken utterance.

FIG. 7 presents a conceptual diagram of an example of how a spoken utterance is processed, allowing a system to capture and execute commands spoken by a user, such as spoken commands that may follow a wakeword. The various components illustrated may be located on a same or different physical devices. Communication between various components illustrated in FIG. 7 may occur directly or across a network 805. An audio capture component, such as a microphone of a client device 861, captures audio corresponding to a spoken utterance. The client device 861, using a wakeword detection module 1220, then processes the audio, or audio data corresponding to the audio, to determine if a keyword (such as a wakeword) is detected in the audio. Following detection of a wakeword, the device sends audio data 1111 corresponding to the utterance, to a server device 864 that includes an runtime speech recognizer 350. The audio data 1111 may be output from an acoustic front end (AFE) 1256 located on the device 861 prior to transmission. Or the audio data 111 may be in a different form for processing by a remote AFE 1256, such as the AFE 1256 located with the runtime speech recognizer 350.

The wakeword detection module 1220 works in conjunction with other components of the device, for example a microphone (not pictured) to detect keywords in audio. For example, the client device 861 may convert audio into audio data, and process the audio data with the wakeword detection module 1220 to determine whether speech is detected, and if so, if the audio data comprising speech matches an audio signature and/or model corresponding to a particular keyword.

The device 861 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the client device 861 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the client device 861 (or separately from speech detection), the client device 861 may use the wakeword detection module 1220 to perform wakeword detection to determine when a user intends to speak a command to the device 861. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 1220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the client device 861 may "wake" and begin transmitting audio data 1111 corresponding to input audio to the server device(s) 864 for speech processing. Audio data corresponding to that audio may be sent to a server device 864 for routing to a recipient device or may be sent to the server for speech processing for interpretation of the included speech (either for purposes of enabling voice-communications and/or for purposes of executing a command in the speech). The audio data 1111 may include data corresponding to the wakeword, or the portion of the audio data corresponding to the wakeword may be removed by the local device 861 prior to sending. Further, a local device 861 may "wake" upon detection of speech/spoken audio above a threshold, as described herein. Upon receipt by the server(s) 864, the runtime speech recognizer 350 may convert the audio data 1111 into text. The recgonizer transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance with reference to acoustic models 1253 and language models 1254. Generally, the acoustic models 1253 include data that characterizes input data corresponding to different speech sounds (e.g., phonemes or other subword units) and structure of words in terms of subword units, with the language models 1254 characterize the possibility or likelihood of different word sequences. In some examples, the acoustic models include weights used to configure one or more artificial neural networks (ANNs), such as a neural network that accepts as input a portion of the input data (e.g., as a vector of numerical values) and produces as output scores associated with different subword units. Other forms of acoustic models 1253 may also be used, for example, using parameterized probability distributions (e.g., Gaussian Mixture Models, GMMs).

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., acoustic models 1253, and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the runtime speech recognizer 350 outputs the most likely text recognized in the audio data. The recognizer may also output multiple hypotheses in the form of a lattice or an N-best list with each hypothesis corresponding to a confidence score or other score (such as probability scores, etc.).

The device or devices performing speech recognition processing may include an acoustic front end (AFE) 1256 and a speech recognition engine 1258. The acoustic front end (AFE) 1256 transforms the audio data from the microphone into data for processing by the speech recognition engine. The speech recognition engine 1258 processes the speech recognition data using acoustic models 1253, language models 1254, and other data models and information for recognizing the speech conveyed in the audio data, for example, determining a best matching and/or highest scoring word sequence corresponding to the input data. The AFE may reduce noise in the audio data and divide the digitized audio data into frames representing time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for speech recognition processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1258 may process the output from the AFE 1256 with reference to information stored in the configuration data 390. Alternatively, post front-end processed data (such as feature vectors) may be received by the device executing speech recognition processing from another source besides the internal AFE. For example, the device 861 may process audio data into feature vectors (for example using an on-device AFE 1256) and transmit that information to a server across a network 805 for speech recognition processing. Feature vectors may arrive at the server encoded, in which case they may be decoded prior to processing by the processor executing the speech recognition engine 1258.

The speech recognition engine 1258 attempts to match received feature vectors to language phonemes and words as known in the stored acoustic models 1253 and language models 1254. The speech recognition engine 1258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, banking, etc.

The speech recognition engine 1258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following processing by the runtime speech recognizer 350, the text-based results may be sent to other processing components, which may be local to the device performing speech recognition and/or distributed across the network(s) 805. For example, speech recognition results in the form of a single textual representation of the speech, an N-best list including multiple hypotheses and respective scores, lattice, etc. may be sent to a server, such as server 864, for natural language understanding (NLU) processing, such as conversion of the text into commands for execution, either by the device 861, by the server 864, or by another device (such as a server running a specific application like a search engine, etc.).

The device performing NLU processing 960 (e.g., server 864) may include various components, including potentially dedicated processor(s), memory, storage, etc. As shown in FIG. 7, an NLU component 960 may include a named entity recognition (NER) module 1262 which is used to identify portions of query text that correspond to a named entity that may be recognizable by the system. A downstream process called named entity resolution actually links a text portion to an actual specific entity known to the system. To perform named entity resolution, the system may utilize gazetteer information stored in NLU data 1970. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from speech recognizer 350 on the utterance input audio) and attempts to make a semantic interpretation of the text. That is, the NLU process determines the meaning behind the text based on the individual words and then implements that meaning. NLU processing 960 interprets a text string to derive an intent or a desired action from the user as well as the pertinent pieces of information in the text that allow a device (e.g., device 861) to complete that action. For example, if a spoken utterance is processed using recognizer 350 and outputs the text "call mom" the NLU process may determine that the user intended to activate a telephone in his/her device and to initiate a call with a contact matching the entity "mom" (which may involve a downstream command processor 970 linked with a telephone application).

The NLU may process several textual inputs related to the same utterance. For example, if the recognizer 350 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Further, the NLU process may be used to provide answer data in response to queries, for example using the knowledge base 1272.

To correctly perform NLU processing of speech input, an NLU process 960 may be configured to determine a "domain" (also referred to as the "skill") of the utterance so as to determine and narrow down which services offered by the endpoint device (e.g., server 864 or device 861) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 1262 receives a query in the form of ASR results and attempts to identify relevant grammars and lexical information that may be used to construe meaning. To do so, the NER module 1262 may begin by identifying potential domains that may relate to the received query. The NLU data 1290 includes a databases of devices identifying domains associated with specific devices. For example, the device 861 may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing module 960, a domain may represent a discrete set of activities having a common theme, such as "shopping", "music", "calendaring", etc. As such, each domain may be associated with a particular language model and/or grammar database in a linguistic grammar storage 1276, a particular set of intents/actions in a skill and intent models storage 1278, and a particular personalized lexicon. Each gazetteer may include domain-indexed lexical information associated with a particular user and/or device. For example, a Gazetteer A includes domain-index lexical information. A user's music-domain lexical information might include album titles, artist names, and song names, for example, whereas a user's contact-list lexical information might include the names of contacts. Since every user's music collection and contact list is presumably different, this personalized information improves entity resolution.

As noted above, in traditional NLU processing 960, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 1264 processes the query to determine an intent or intents for each identified domain, where the intent corresponds to the action to be performed that is responsive to the query. Each domain is associated with an intents classifier that generally processes text output from the speech recognizer to identify or score possible intents expressed in the input data. In some examples, the intent classifier uses a database of words linked to intents, while in other examples, a neural network based classifier maps input words to output scores for various intents. For example, a music intent database may link words and phrases such as "quiet," "volume off," and "mute" to a "mute" intent.

In order to generate a particular interpreted response, the NER 1262 applies the grammar models and lexical information associated with the respective domain to actually recognize a mention one or more entities in the text of the query. In this manner the NER 1262 identifies "slots" (i.e., particular words in query text) that may be needed for later command processing. Depending on the complexity of the NER 1262, it may also label each slot with a type of varying levels of specificity (such as noun, place, city, artist name, song name, or the like). Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by the IC module 1264 are linked to domain-specific grammar frameworks with "slots" or "fields" to be filled. Each slot/field corresponds to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 1262 may parse the query to identify words as subject, object, verb, preposition, etc., based on grammar rules and/or models, prior to recognizing named entities. The identified verb may be used by the IC module 1264 to identify intent, which is then used by the NER module 1262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 1262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 1264 will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 1262 may search the database of generic words associated with the domain. So for instance, if the query was "play songs by the rolling stones," after failing to determine an album name or song name called "songs" by "the rolling stones," the NER component 1262 may search the domain vocabulary for the word "songs." In the alternative, generic words may be checked before the gazetteer information, or both may be tried, potentially producing two different results.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 970, which may be located on a same or separate server 864. The destination command processor 970 may be determined based on the NLU output. For example, if the NLU output includes a command to play music, the destination command processor 970 may be a music playing application, such as one located on device 861 or in a music playing appliance, configured to execute a music playing command. If the NLU output includes a search request, the destination command processor 970 may include a search engine processor, such as one located on a search server, configured to execute a search command.

In FIG. 7, a single NLU module 960 is shown. In some embodiments, referred to as a multi-domain architecture, multiple separate NLU modules 960 are present, with each domain being associated with a corresponding NLU module 960. In the multi-domain architecture, each domain (which may include a set of intents and entity slots that define a larger concept such as music, books etc. as well as components such as trained models, etc. used to perform various NLU operations such as NER, IC, or the like) is constructed separately and made available to an NLU component 960 during runtime operations where NLU operations are performed on text (such as text output from an speech recognizer 350). Each domain may have specially configured components to perform various steps of the NLU operations.

In some embodiments, some of the procedures described in this document may be implemented in special purpose circuitry, for example, in an application specific integrated circuit (ASIC) or in a field programmable gate array (FPGA). Such circuitry may perform some computationally intensive aspects, for example, the processing of the speech processor and recognizer or the intent classifiers. In some embodiments, multiple processor cores, graphical processor units, and other related circuitry are integrated into a single integrated circuit that implements some or all of the functions of the runtime configuration.

In the example described above, training using partially annotated data makes use of a sampling layer 340 (see FIG. 3) that links the highest value input to its output. An alternative to the sampling layer may also pass the highest value input to one output, and pass a sum of the other inputs to a second output. In this way, the target output may be set to (1.0, 0.0) in the case of a correct result, and (0.0, 1.0) in the case of an incorrect result, and each data item causing updates to the parameter values using a Back Propagation approach. In another alternative, all the outputs corresponding to the different intents are used during training, with in the case that the system makes a correct classification the target outputs set to 1.0 for the correct output and 0.0 for the others. In the case of an incorrect output, the incorrectly identified output is set to 0.0, and the remaining outputs are set of non-zero values. For example, a sum of 1.0 is distributed equally among the other outputs (of which only one is correct), or weighted by a prior or posterior (i.e., based on the user's input and knowledge that the system is incorrect) probability distribution.

In the description above, the intent classifier 140 is described as a neural network. It should be understood that many other parameterized approaches can be used that are not necessarily neural networks. When the output value is differentiable with respect to each of the parameters (or the output does not depend of the parameter), essentially the same procedure may be used. For some types of classifiers, iterative incremental updates to the parameters values may not be necessary, and a batch update may be possible.

In the description above, the terms "recognizer" is generally used to connote a processing of an input to determine an output from a substantially open or combinatorially large set of options (e.g., possible word sequences in a vocabulary), while "classifier" is generally used to connote processing of an input to determine an output from a substantially limited set of options (e.g., an enumerated set of skills or intents). Neither of these terms should be construed to require that only a single output is provided. For example, both a "recognizer" and a "classifier" may provide multiple possible outputs, and may provide ranking or scores associated with such multiple outputs. In particular embodiments, implementations of a "recognizer" are not necessarily substantially different than implementations of a "classifier".

The partial annotation described above uses a binary annotation, for example, with a target output score of 0.0 for incorrect and a target of 1.0 for correct. In an alternative, the annotator may provide a number in the range 0.0 to 1.0 to express a degree of correctness, and the parameter updating procedure takes into account how different the top score is than the annotated degree of correctness.

It is to be understood that the foregoing description is intended to illustrate and not to limit the scope of the invention, which is defined by the scope of the appended claims. Other embodiments are within the scope of the following claims.

What is claimed is:

1. A method for configuring a natural language (NL) understanding system, the NL understanding system including at least an intent classifier, the intent classifier comprising a neural network configurable with configuration data including neural network weights to distinguish a plurality of intents based on a linguistic input, the method comprising:

configuring the intent classifier with first configuration data, the first configuration data having been determined from first collected data comprising input data items each annotated with a specific intent of a plurality of intents, the neural network weights of the first configuration data having been determined to best match the input data items and the annotated specific intents;

processing a second plurality of user inputs to the system, wherein the processing includes, for each of the second plurality of user inputs, using the intent classifier configured with the first configuration data to determine a recognized intent corresponding to said input, and causing determination of a corresponding response to the input based on the recognized intent;

storing second collected data, the second collected data comprising, for each of the second plurality of user inputs, a representation of the user input and a corresponding response;

receiving manual annotation for the second collected data, an annotation for each item of the second collected data indicating whether the corresponding response is consistent with the user input, thereby forming second annotated data without requiring annotating a correct intent for user inputs for which the caused action does not sufficiently match the user input;

determining second configuration data for the intent classifier, the second configuration data being determined to distinguish the plurality of intents by computing the second configuration data to match the second annotated data, including treating correct intents as latent variables that are not represented in the second annotated data, the determining including incrementally updating the neural network weights of the second configuration data; and configuring the intent classifier with the second configuration data.

2. A method for configuring a natural language (NL) understanding system, the NL understanding system including at least a linguistic classifier, the linguistic classifier being configurable with configuration data to distinguish a plurality of linguistic categories based on a linguistic input, the method comprising:

configuring the linguistic classifier with first configuration data;

processing a second plurality of user inputs to the system, wherein the processing includes, for each of the second plurality of user inputs, using the linguistic classifier configured with the first configuration data to determine a recognized linguistic category corresponding to said input, and causing determination of a corresponding response to the input based on the recognized linguistic category;

storing second collected data, the second collected data comprising, for each of the second plurality of user inputs, a representation of the user input and the corresponding responses;

receiving annotations for the second collected data, an annotation for each item of the second collected data indicating whether the corresponding response is consistent with the user input;

determining second configuration data for the first linguistic classifier, the second configuration data being determined to distinguish the plurality of linguistic categories by computing the second configuration data to match the second annotated data; and configuring the linguistic classifier with the second configuration data.

3. The method of claim 2 wherein the linguistic classifier comprises an intent classifier, and the linguistic categories comprise user intents.

4. The method of claim 2 wherein the linguistic classifier comprises a slot recognizer, and the linguistic categories comprise slots.

5. The method of claim 2 further comprising determining the first configuration data including receiving first annotated data, the first annotated data associating each user input of a plurality of user input of first collected data with a corresponding linguistic category of the plurality of categories; and computing the first configuration data for the first linguistic classifier to distinguish the plurality of linguistic categories by selecting the first configuration data to match the first annotated data.

6. The method of claim 5 wherein determining the second configuration data further comprises selecting the second configuration data to further match the first annotated data.

7. The method of claim 2 wherein processing a second plurality of user inputs to the system further comprises:

applying an automated speech recognition procedure to data representing speech inputs of the users to determine a text-based representations of the inputs;

producing linguistic representations of the inputs from the text-based representations of the inputs; and providing the linguistic representations to the first linguistic classifier, which provides corresponding recognized linguistic categories as outputs.

8. The method of claim 2 wherein the linguistic classifier comprises an artificial neural network (ANN), and the first configuration data and the second configuration data comprise values of weights of the ANN.

9. The method of claim 8 wherein configuring the linguistic classifier with data comprises storing values of the weights of the ANN in a storage for access during execution of software instructions implementing the ANN.

10. The method of claim 8 wherein determining the second configuration data for the linguistic classifier comprises applying an incremental updating procedure of the weights of the ANN.

11. The method of claim 10 wherein applying the incremental updating procedure comprises applying a Back Propagation procedure.

12. The method of claim 10 wherein applying the incremental updating procedure includes treating correct linguistic categories as latent variables that are not represented in the second annotated data.

13. The method of claim 2 wherein the representations of the first plurality of user inputs comprise text-based representations of said inputs.

14. The method of claim 2 wherein the representations of the actions comprise text-based representations of said actions.

15. A natural language (NL) understanding system comprising:

a speech recognizer configured to process a speech input to produce an output;

a linguistic feature extractor configured to process the output of the speech recognizer to produce a linguistic representation of the speech input, the linguistic representation comprising a fixed-length numerical vector;

a linguistic classifier, the linguistic classifier being configurable with configuration data to distinguish a plurality of linguistic categories based on a linguistic input;

a classifier initializer for determining first configuration data for the first linguist classifier;

a classifier updater for determining second configuration data for the first linguistic classifier based on a processing of second collected data including a second plurality of user inputs to the system and corresponding actions determined by the system for those inputs, and annotations for each item of the second collected data indicating whether the action matches the user input, the classifier updater being configured to determining second configuration data for the first linguistic classifier to distinguish the plurality of linguistic categories by computing the second configuration data to match the second annotated data.

16. The system of claim 15 wherein the linguistic feature extractor is configured to determine values of at least some entries of the fixed-length numerical vector according to presence of words corresponding to said entries.

17. The system of claim 15 wherein the linguistic classifier comprises an artificial neural network (ANN), and the first configuration data and the second configuration data comprise values of weights of the ANN.

18. The system of claim 17 wherein the classifier updater is configured to determining the second configuration data by applying an incremental updating procedure of the weights of the ANN.

19. The method of claim 18 wherein applying the incremental updating procedure comprises applying a Back Propagation procedure.

20. The method of claim 18 wherein applying the incremental updating procedure includes treating correct linguistic categories as latent variables that are not represented in the second annotated data.

\* \* \* \* \*